(12) United States Patent
Wickham (10) Patent No.: US 8,257,584 B2
(45) Date of Patent: Sep. 4, 2012

(54) SOLID DIGESTING WASTE TREATMENT UNIT

(75) Inventor: Daniel E. Wickham, Sebastapol, CA (US)

(73) Assignee: Wickham Jenks Holdings, LLC, Petoskey, MI (US)

( * ) Notice: Subject to any disclaimer, the term of this patent is extended or adjusted under 35 U.S.C. 154(b) by 0 days.

(21) Appl. No.: 13/338,928

(22) Filed: Dec. 28, 2011

(65) Prior Publication Data

US 2012/0097588 A1 Apr. 26, 2012

Related U.S. Application Data

(62) Division of application No. 12/390,150, filed on Feb. 20, 2009, now Pat. No. 8,110,107.

(60) Provisional application No. 61/029,985, filed on Feb. 20, 2008.

(51) Int. Cl.
*C02F 3/00* (2006.01)

(52) U.S. Cl. ....................................................... 210/151

(58) Field of Classification Search ........... 210/150–151
See application file for complete search history.

(56) References Cited

U.S. PATENT DOCUMENTS

| | | |
|---|---|---|
| 5,531,898 A | 7/1996 | Wickham |
| 6,660,163 B2 | 12/2003 | Miklos |
| 6,780,318 B2 | 8/2004 | Fife et al. |
| 7,462,285 B2 | 12/2008 | Wickham |
| 2002/0023875 A1 | 2/2002 | Lorenz et al. |
| 2003/0159988 A1 | 8/2003 | Daigger et al. |
| 2005/0077237 A1 | 4/2005 | Wickham |
| 2007/0218537 A1 | 9/2007 | Furukawa et al. |

*Primary Examiner* — Chester Barry
(74) *Attorney, Agent, or Firm* — Edward S. Sherman (57) ABSTRACT

The wastewater treatment tank results in high quality effluent meeting what is referred to as "Secondary Treatment Standard. The tank deploys in combination an Facultative Aerobic Bacterial Generators (FABG) that includes a plurality of surrounding horizontally extending bacteria supporting filters disposed in a vertical array along with a second vertical filter media disposed between the FABG and the outlet port. A facultative bacteria generator and additional bacteria supporting filters are also deployed adjacent the FABG and between the second vertical filter media.

20 Claims, 10 Drawing Sheets

SOLID DIGESTING WASTE TREATMENT UNIT

CROSS REFERENCE TO RELATED APPLICATIONS

The present application claims the benefit of priority from the U.S. Provisional patent application of the same title filed on Feb. 20, 2008, having application Ser. No. 61/029,985, which is incorporated herein by reference.

The present application is a Division of and claims the benefit of priority to the US Non-Provisional patent application of the same title that was filed on Feb. 20, 2009 having application Ser. No. 12/390,150 now U.S. Pat. No. 8,110,107, and is incorporated herein by reference.

BACKGROUND OF INVENTION

The present invention relates to Aerobic Bacterial Generators (ABGs) used for wastewater treatment and in particular an improved treatment method and unit that digests solids and expels highly treated liquid effluent.

Facultative Aerobic Bacterial Generators (FABGs) are devices described in Pat. No. 6,780,318 that are designed for the generation of a continuous supply of facultative bacteria within a conventional septic tank that can be used to digest clogging mucous compounds in the soil based disposal fields that septic tanks discharge to.

Such a device has several advantages for onsite wastewater treatment. One is that the units are portable and can be retrofitted into almost any size or type of existing onsite wastewater tank. Another is that the units are highly efficient, using pressurized air to generate a high volume stream of liquid over an internal matrix upon which the cultured bacteria grow.

Experience with these devices has shown that often their use results in creation of a high quality effluent, sometimes meeting what is referred to as "Secondary Treatment Standard". This standard (NSF-40), by the National Sanitary Foundation is typically defined as having 30 mg/l or less of Biological Oxygen Demand (BOD) and 30 mg/l or less of Total Suspended Solids (TSS). Achieving such a standard is of great benefit since it allows a wider range of discharge options than a conventional septic leach system, the system wherein FABGs have typically been restricted to. Such options include direct aquatic discharge, discharge on lots typically too small for conventional septic leach, discharge into soils that are too tight for conventional septic based leach and systems where the ground water level is high and therefore to close to the discharge point for conventional septic effluent and finally use as irrigation water in reclamation systems.

Up until now the industry has utilized devices called Advanced Treatment Units (ATUs) to treat household waste to the secondary standard. Most of these are large scale mechanical units that include specialized tanks, mixers, stirrers, aerators, etc. to achieve treatment. It would be a great benefit to the industry if a simple and inexpensive, retrofittable, portable treatment unit could be developed that could not only meet secondary standards, but also do so in a range containment vessels including tanks of various sizes and shapes, ponds or other impoundments.

The previously mentioned Facultative Aerobic Bacterial Generator, unfortunately, has characteristics that make it difficult to consistently meet secondary treatment standards. The most widespread protocol currently used in the industry to certify onsite treatment units capable of meeting secondary treatment levels is the NSF-40 standard developed by the National Sanitation Foundation. To date attempts to meet this goal with a conventional FABG, such as is described in U.S. Pat. No. 6,780,318 have been unsuccessful.

So far all of the ATU systems that have met this standard have consisted of aerobic treatment tanks or devices that are preceded by a clarification tank that is equivalent to a septic tank. Typically only the soluble dissolved organic fraction is treated by these units. The bulk of the organic waste consists of particulate solids that settle out in the clarification tank and these must be pumped out on a regular basis and sent to a municipal treatment plant for final treatment.

The FABG is the only device in the onsite treatment field that is installed directly into tanks receiving both the soluble and particulate organic material. Experience with the devices has shown that almost all of the solids are degraded in the tanks This makes the FABG a far more useful tool than an ATU, in that almost all of the organic material is digested in situ rather than having to be shipped elsewhere for final treatment.

However, the fate of these solids is twofold. A substantial fraction is digested to $CO_2$ but the remaining portion is processed into the bacterial population being generated within the device. Where FABGs are used to help clear clogged septic leach fields, as described in Pat. No. 6,780,318, these bacteria are not a problem. In fact they are necessary to the process. But bacteria will contribute to BOD as well as TSS and the effluent can be higher than the desired 30/30 BOD/TSS standard that would allow broader disposal options.

It is therefore a first object of the present invention to provide simple additional component that can easily be installed with a standard FBG to extend its treatment capacity so it can reliably produce effluent of secondary or better quality.

It is yet another object of the present unit to provide a waste treatment unit that digests organic material in situ, avoiding the need for the collection and disposal of sludge off site.

SUMMARY OF INVENTION

In the present invention, the first object is achieved by providing a solid digesting treatment tank comprising a fluid containing vessel with an inlet port and an outlet port, an FABG having a plurality of surrounding horizontally extending filters disposed in a vertical array, a vertical filter media disposed between the FABG and the outlet port.

A second aspect of the invention is characterized in that the above solid digesting treatment tank is subdivided into two tanks, with the first tank having with an inlet port and an outlet port to the $2^{nd}$ tank, an FABG having a plurality of surrounding horizontally extending filters disposed in a vertical array, a vertical filter media disposed between the FABG, the $2^{nd}$ tank then having the device outlet port.

A third aspect of the invention is characterized by the above solid digesting treatment tank also comprising a plurality of vertically disposed filters in an array wherein the filters are parallel to each other and transverse to the vertical filter media disposed between the FABG and the outlet port.

A further aspect of the invention is characterized in that at least one of the above filter media provides organic carbon in the form of cellulose to sustain the facultative bacteria associated with at least one ABG that acts as a Facultative Aerobic Bacteria Generator (FABG).

The above and other objects, effects, features, and advantages of the present invention will become more apparent from the following description of the embodiments thereof taken in conjunction with the accompanying drawings.

BRIEF DESCRIPTION OF THE DRAWINGS

FIGS. 6A and 6B illustrates the device evaluated to generate the data in FIG. 5B, in which FIG. 6A is a perspective internal view and FIG. 6B is a side cross-sectional elevation thereof.

DETAILED DESCRIPTION

Referring to FIGS. 1 through 7, wherein like reference numerals refer to like components in the various views, there is illustrated therein a new and improved solid digesting treatment tank, generally denominated 100 herein.

Figure 1A:
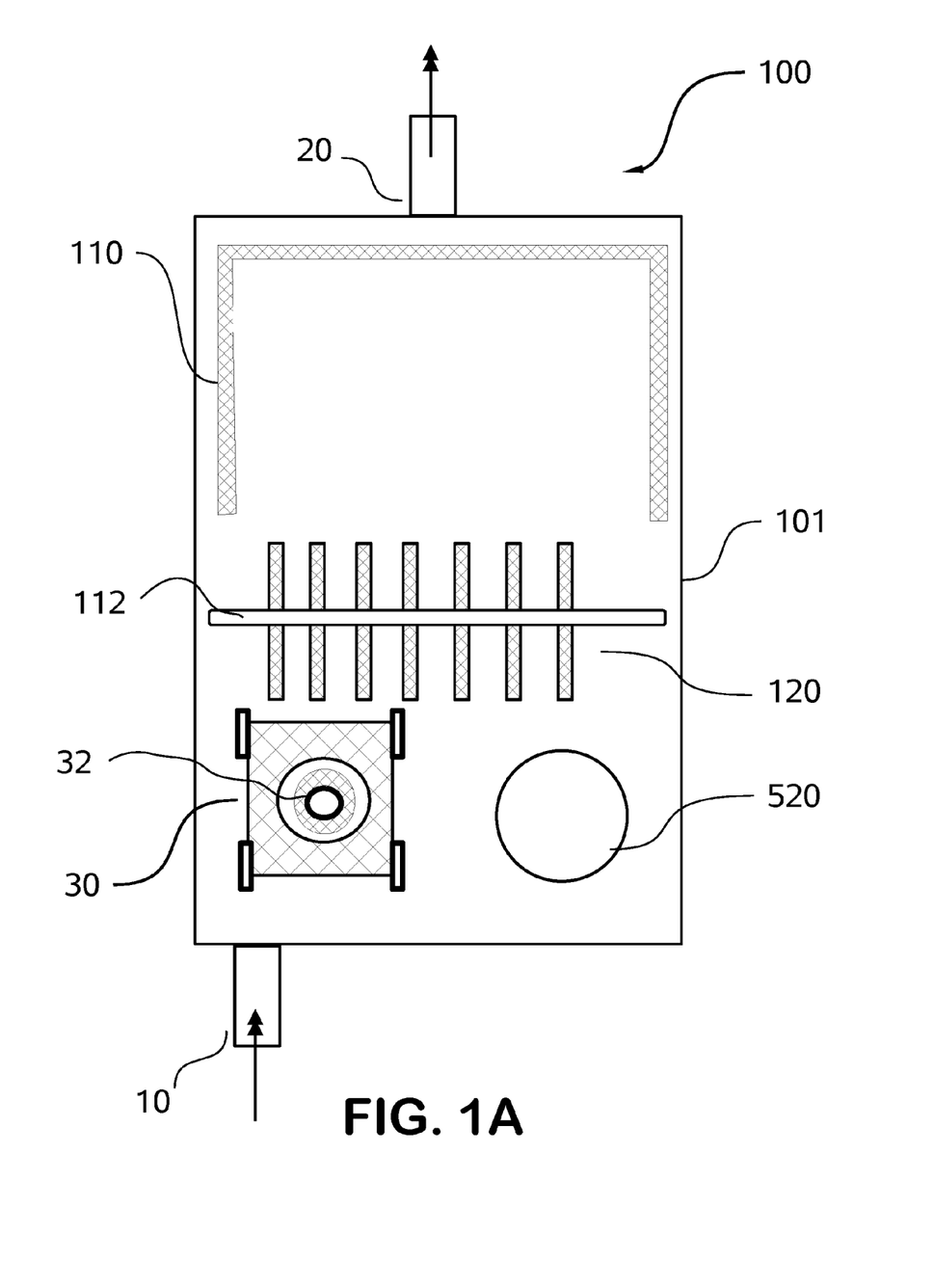
FIG. 1A is a plan view of a solid digesting treatment tank deploying an FBG with a first and second filter.
Figure 1B:
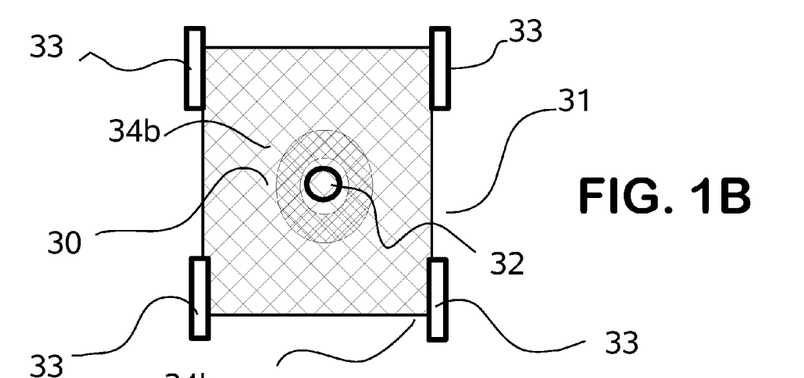
FIG. 1B is plan view of the first FBG filter component which consists of floating vertical strips of pad material that are suspended near the active mixing zone of the inserted FBG device.
Figure 1C:
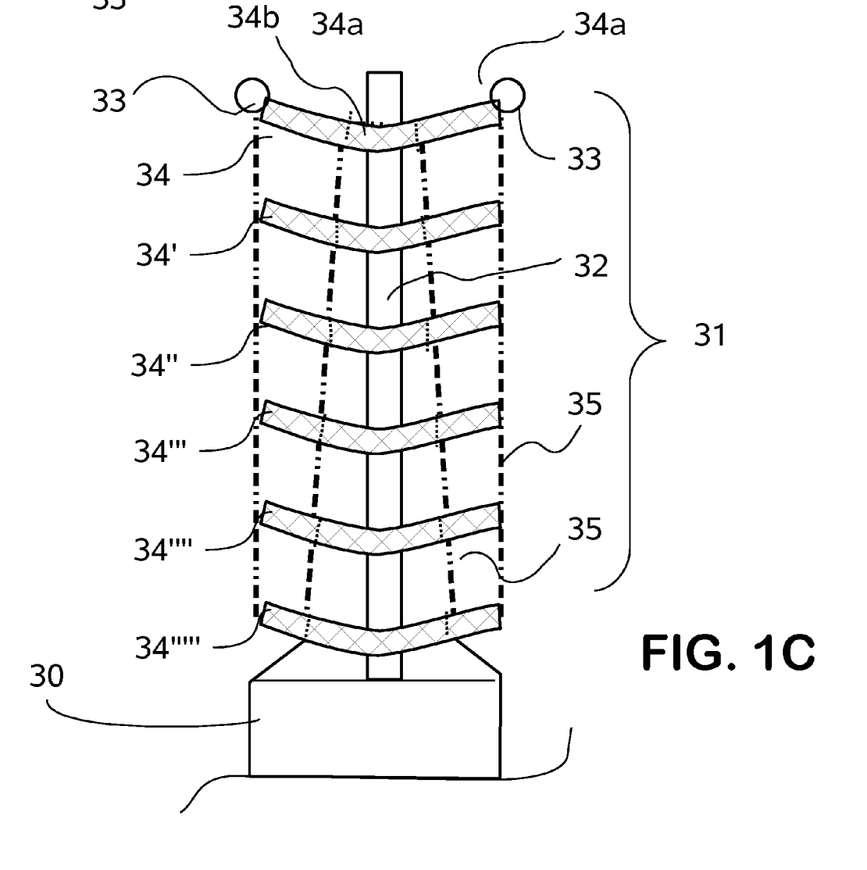
FIG. 1C is a cross-sectional elevation of the first filter component shown in FIG. 1A.
Figure 2A:
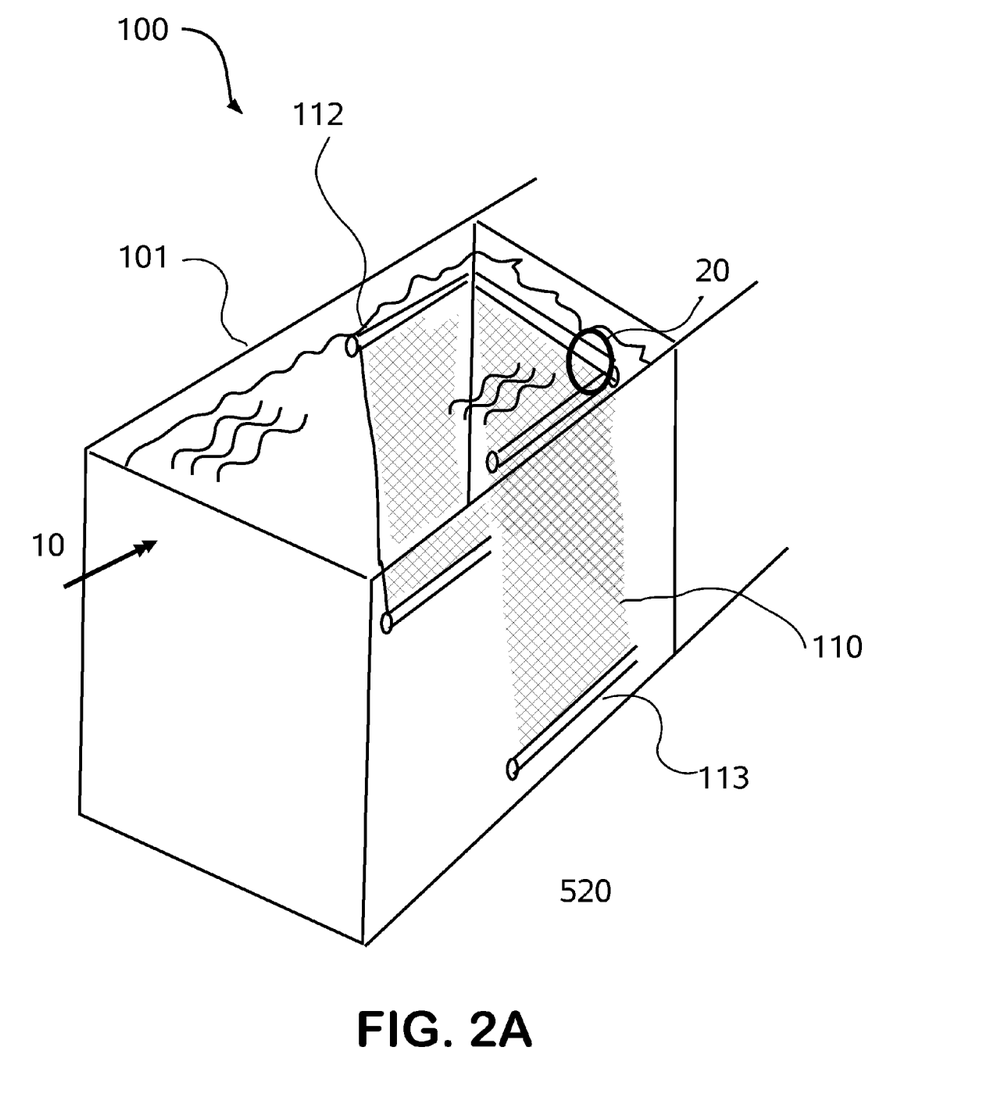
FIG. 2A is a cut-away perspective view of the solid digesting treatment tank showing the orientation of the second filter component with respect to the tank outlet and the tank walls.
Figure 2B:
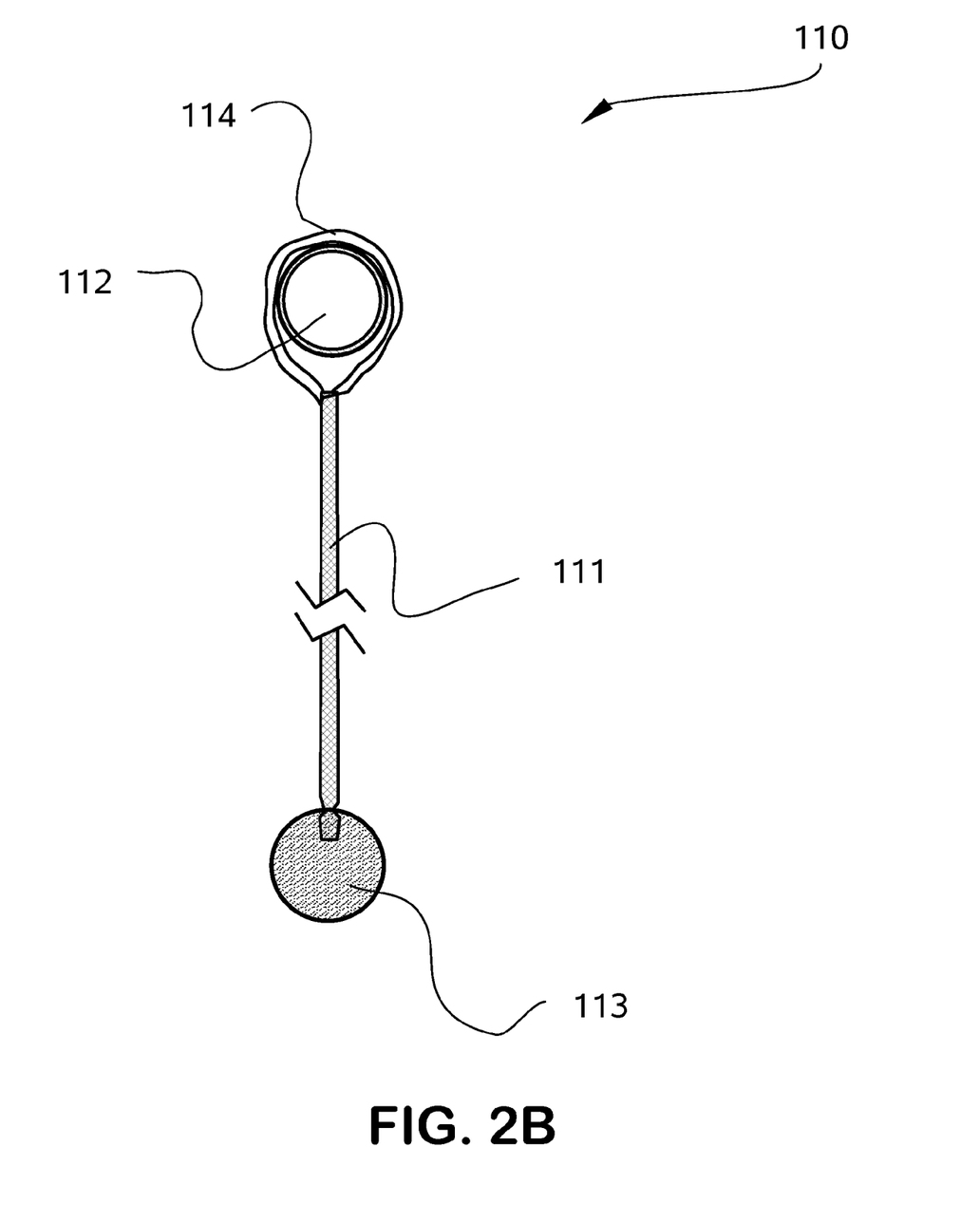
FIG. 2B is a cross-sectional elevation of the second FBG filter component taken transverse to the plane of the filter sheet to an embodiment of its supporting structure within the tank.

FIG. 1 is a plan view of a wastewater treatment device 100 deploying an FABG with filters that constitutes a first embodiment of the invention. The waste water treatment device 100 comprises a chamber or vessel 101 for receiving waste water. The vessel may have one or multiple portals for adding wastewater and removing treated wastewater. Only a single inlet port 10 and a single outlet port 20 are shown. The FABG 30 is deployed within the treatment tank. The FABG 30 includes a first array of filters 31 shown in FIGS. 1B and C, whereas a second filter or matrix 110 is disposed in chamber 101 between the FABG 30 and the outlet 20. Further details of the second filter are shown in FIGS. 2A and 2B. FIG. 1A also shows the position of additional optional components described further with respect to the embodiments of FIG. 3 and FIG. 4, that include an additional filter array 120 and a separate device 520 that grows autotrophic bacteria capable of oxidizing ammonia in wastewater to $NO_2$ is added along with the FABG 30 device. As disclosed in U.S. Pat. No. 7,462,285, the FABG 30 generates a continuous supply of facultative aerobic bacteria from a biological host material supported above an air dispensing manifold or the like in a vertical column like subchamber to provide partial isolation from the surrounding fluid in the treatment vessel so that a controlled circulating flow transfers some of the growing facultative aerobic bacteria to the surrounding fluid.

In the various embodiments, the invention may comprise sheets or mats of a matrix or filter materials that can be added into a tank with an FABG and that can be attached or arrayed on or near the FABG. These devices are preferably constructed of a material that provides the highest surface area for bacterial attachment as possible. They are more preferably arranged so that circulating, highly aerobic liquid from the FABG device passes over or through the maximum amount of this attached bacterial matrix. Most preferably, they act as a filter so that solids can be captured by the material as liquid passes through.

In accordance with the present invention, FIG. 1 illustrates a preferred embodiment in which such filter pads are a fibrous porous material of the type frequently used for furnace filter pads.

The arrangement of the pads is twofold. As shown in more detail in FIG. 2, a first component consists of a floating vertical array of strips of pad material 31 that are suspended near the active mixing zone of the inserted FABG 30 device. These act primarily as fixed film surfaces designed to allow the capture of suspended organic material as well as surfaces for bacteria to grow where they will be exposed to turbulent, aerated flow as effluent passes over the colony. In this embodiment the strips or sheet of filter pads or media for supporting bacterial colonies and trapping solid waste 34 are approximately 25"×30"×1" thick and are connected by braided nylon twine 35 at the outer corners 34a and the inner central opening 34b. This array of pads 31 is attached to the upper rim of the FABG 30 unit so that the arrayed and spaced apart pads 34, 34', 34", 34'", 34"" and 34""' float horizontally above the turbulent flow generated by the FABG 30. A center opening 34b in each layer facilitates mixing through the assemblage (FIG. 1). Air, the source of oxygen is then fed to the FABG 30 by ½ inch diameter PVC air supply tube 32. Four floats 33 formed of 1½ diameter PVC about 5 inches long is connect at the corners 34a to the top of the top media pad 34. The central openings in the pads 34 to 34""' increase in diameter from 7 inches in 1 inch increments to the final media pad 34""' just above the FABG 30.

It will be appreciated by one of ordinary skill in the art, upon having the benefit of this disclosure, that other filter or matrix materials could be used, such as for example floating plastic balls held in a cage or commercially available plastic honeycomb fixed film media. These would likely not be as easy to install or be as effective as the filter pads; however, they would meet the intent of this invention.

Preferably, the second component 110 consists of a single sheet of a preferably identical fibrous filter material or matrix media 111 to that for pads 34 and in one embodiment is suspended at the water surface by a floatation device 112 and is allowed to descend to within an inch or so of the bottom of the tank 101, using a weighted component 113 if necessary such that the sheet of filter material hangs like a curtain.

Figure 3:
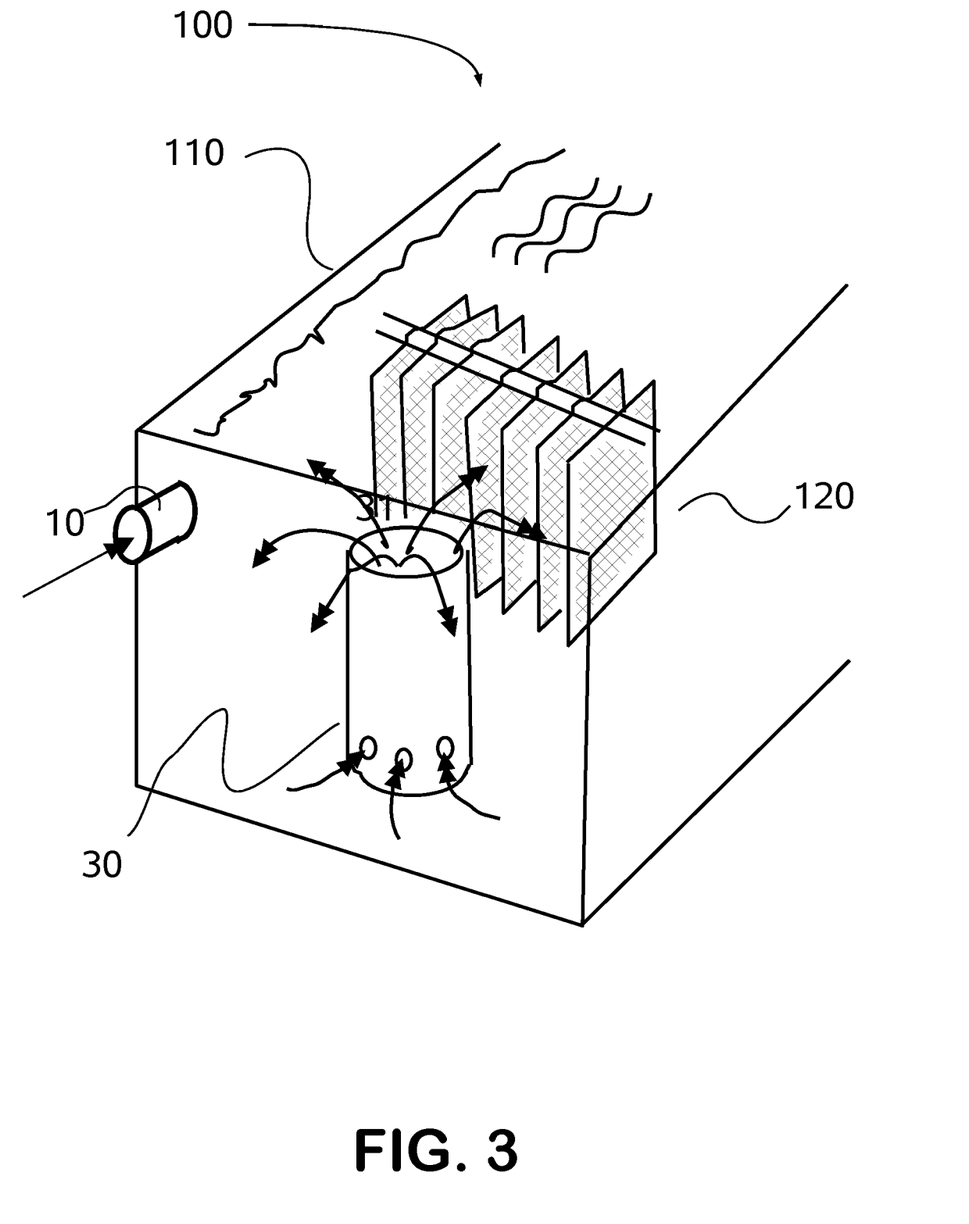
FIG. 3 is a cut-away perspective view of the solid digesting tank showing the orientation of a filter array with respect to the FBG mixing aerator disposed at one side of the tank.

As shown in FIG. 3, a 1½ in. diameter PVC pipe about 60" long is capped to act as a float 112. Braided NYLON™ twine 114 is tied around the float tube 112 to the filter member 111, which is typically about 1" thick, so that it can then that acts as a biological growth media, The media 111 is held in place by a weighted tube 113 attached at the bottom. The weighted tube is also 1½ in. diameter PVC pipe, but is filled with sand before it is capped. Further, it is slit at the top so that the bottom edge of the filter media can be inserted when it is pinched open, being held tight by pressure when the tube is no longer flexed, the slit ends thus pinching and compressing the filter media Alternatively, the floats 112 and weights 113 are optional when the filter media 111 is maintained in a frame that is mounted to the interior walls of the vessel or tank 101.

It should also be appreciated that in the various embodiments the tank or vessel shape is arbitrary provided it is generally of sufficient in size to treat the flux of waste water. However, when varying the tank shape and size form that shown in the various embodiments the size, area and placement of the filter media 120, 111 and 31 may need to be adjusted, with a higher volume tank would generally require a corresponding increase in area of the filter media. It should further be apparent, that each of the filter media 120, 11 and 31 may not be required when the others are present and sized and placed appropriately to provide the same function as described herein.

It should be further appreciated that portals for inlet 10 and outlets 20 and 21 from the vessel 101 and 102 can be holes, such as round square or oval holes for example, as well as baffles, and can enter the tanks or vessel 101 and 102 from above or the side for inlets, as well as from the sides or below for outlets.

In preferred embodiments the filter 110 is situated downstream of the FABG 30 device and the other suspended fibrous matrix, at or near the outlet side of the treatment tank 101. The floatation tubes 112 consist of three independent units attached to the single, flexible sheet 111 such that the middle portion of the sheet is parallel to the end wall of the tank and the two outer portions bend in the upstream direction resulting in a triptych or U-shape (FIG. 2). In this fashion substantially all of the flow passing from the treatment unit will filter through the fabric before it passes out into the next portion of the treatment system.

As shown in FIG. 3, extra floating units of filter media formed in an array 120 can be added in open areas near the mixing zone by floating vertical sheets parallel to the mixed flow. The filter media in array 120 are likewise optionally held at the top to a floating sealed tube 112, and may have weights, such as 113 at the bottom, if not otherwise fixed in a frame or otherwise attached to the bottom of tank or vessel 101.

Figures 4A, 4B:
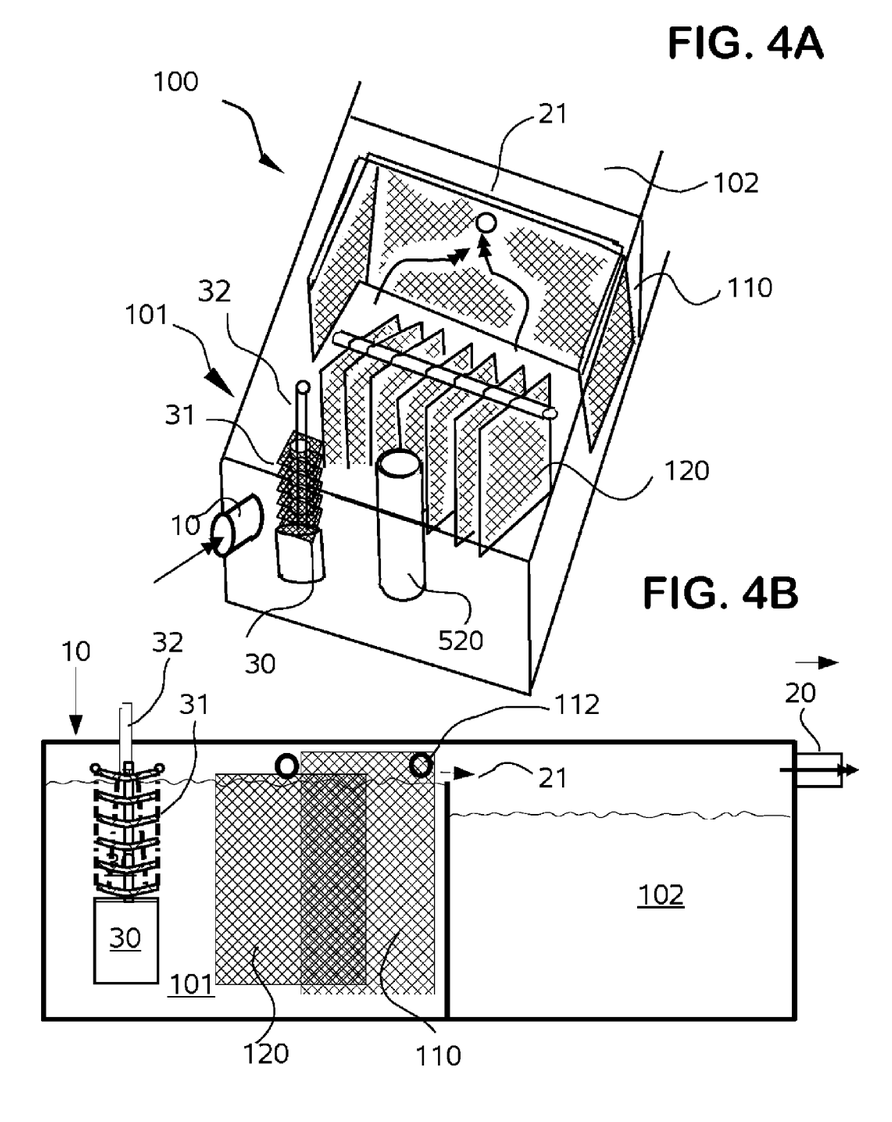
FIG. 4A is a cut-away perspective view of the solid digesting tank showing the orientation of filters in an alternative embodiment that includes a Autotrophic Bacteria generator that grows bacteria capable of oxidizing ammonia in wastewater to $NO_2$.
FIG. 4B is a cross-sectional elevation of the solid digesting tank and adjacent final settling tank of FIG. 4A.

One of the varieties of material used for the fibrous filter matrix can be made from wood products in the form that is commonly referred to as "Excelsior" and is typically used as a packing material. The configuration and behavior of this type of material will be essentially identical to that of inert fibrous matrices, however, the cellulose in the wood of Excelsior material provides advantages when the FABG 30 device and filter matrix are used in association with a similar device that allows one to inoculate the system with ammonia oxidizing bacteria along with the facultative bacteria from the original FABG 30 (FIG. 4), as further explained below.

In the embodiment of FIGS. 4A and B device 100 includes a first chamber 101 that is primarily a solid digesting tank according to the previous embodiments with the outlet 21 directing the fluid output into an adjacent final settling tank 102. The final settling tank has final outlet 20. In this embodiment a separate device 520 that grows autotrophic bacteria capable of oxidizing ammonia in wastewater to $NO_2$ is added along with the FABG 30 device. This Autotrophic Bacterial Generator (ATBG) Device 520 aides in the biological denitrification of nitrogenous compounds in wastewater using a simultaneous reaction under aerobic conditions. To conduct this reaction it is necessary to culture both autotrophic ammonia oxidizing bacteria as well as facultative heterotrophic bacteria such that the facultative heterotrophs can denitrify the oxidized ammonia compounds produced by the autotrophic bacteria as they are produced. The nitrogen gas thus bubbles off the treated liquid waste, thereby eliminating nitrogen contamination. This method is disclosed in further detail in US Pat. Publication. No. 20070227970 A1 (by Wickham; Daniel E., published Oct. 4, 2007) for "Wastewater Purification Method and Apparatus", which is incorporated herein by reference, and issued as U.S. Pat. No. 7,462,285 on Dec. 9, 2008.

Figure 7:
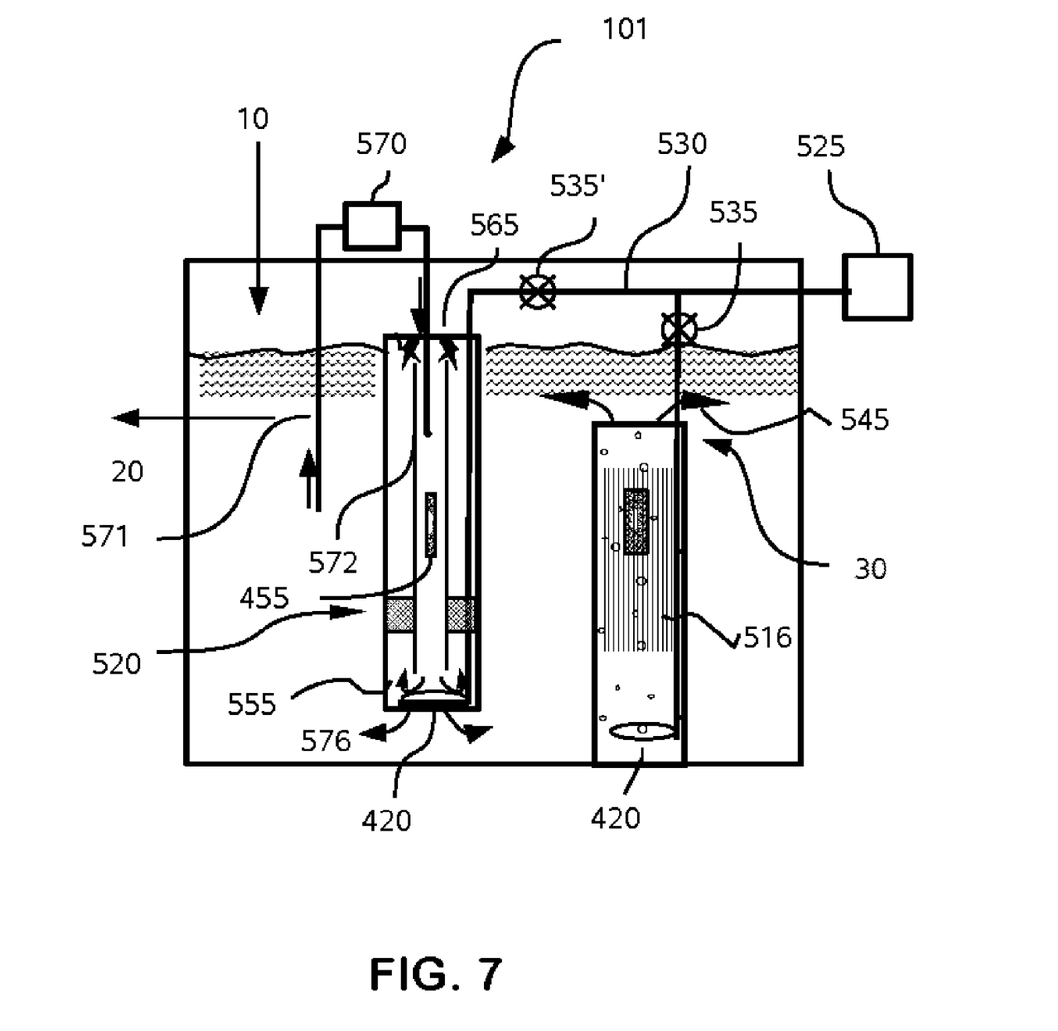
FIG. 7 is a side cross-sectional elevation showing further details of the FBG and FBG in FIGS. 4A and 4B.

FIG. 7 illustrates further details on the preferred embodiment shown in FIG. 4, wherein both FABG devices 30 below and ATBG device 520 are supplied with air from an external pump 525 through pipes 530 to their respective manifolds 420. Valves 535 allow regulation of air flow to the two devices for balancing aeration rates. Air bubbles rising through the manifold 420 in FABG 30 sets up a circulation shown by curved arrows 545 of fluid through the FABG device of liquid entering the base of the device and leaving the top of the device, which is preferably submerged below the water line in the treatment vessel. FABG device 30 includes a biological host material 516 disposed above the air manifold 420. The bacterial host material 455 in the core of ATBG device 520 is optionally a coiled lattice of plastic sheet film or fibrous mat that provides a combination of a high surface area with sufficient porosity so that the flow of liquid there through is not severally impeded. Accordingly, any known bacterial host material is alternatively deployed.

Similarly the air bubbles released within the ATBG device 520 set up a current 555 that flows into the base and up out of the top of the central pipe within the ATBG device 520. Unlike FABG device 30 the outer column of the ATBG device 520 is preferably elevated such that the upper lip 565 is above the water level within the treatment vessel. Alternatively, ATBG device 520 can be below the surface of the liquid and either completely sealed at the top or use 1 way valves (not shown). Liquid is supplied to device 520 via a volumetric pump 570 or an airlift percolation apparatus, such as a narrow tube, that captures the energy of the rising air bubbles from the associated FABG 30. Depending on the means to substantially isolate the ATBG device 520 from free exchange with the surround fluid, the pump 570 may alternatively introduce liquid into the top of the device or elsewhere.

Pump 570 removes fluid from below the surface in vessel 101 via tube portion 571 and feeds it to ATBG device 520 via tube portion 572. It should be appreciated that when pump 570 is replaced with airlift percolation apparatus, tube 571 should be placed proximate to, above or within ATBG device 520 so as to receive fluid under pressure or surge action from the rising air bubbles.

Generally, however it is preferred that liquid flowing into ATBG device 520 from the surrounding vessel 101 displaces liquid within the ATBG device 520 forcing it to pass through perforations at the base of the device and out into the surrounding treatment vessel at a rate equivalent to the rate entering at the top of the device. As ATBG device 520 is closed but for holes or perforations at the bottom, the flow out of the device 520 shown by arrows 576 is rather weak and is intended to be generally about the same as the volume of fluid introduced by pump 570.

In this fashion autotrophic ammonia oxidizing bacteria growing within ATBG device 520 are continuously released to the surrounding treatment vessel.

Flow from pump 570 is regulated so that the turnover time of liquid entering the ABG device 520 is long enough in duration that carbon will be depleted and the environment will favor the growth of autotrophic ammonia oxidizing bacteria.

In this fashion the facultative bacteria produced in FABG device 30 that carry out the denitrification portion of the nitrification/denitrification reaction described earlier can flourish within the treatment vessel 101, but the refuge provided by the ATBG device 520 sets up environmental conditions that favor the autotrophic ammonia oxidizers and protect them from competition by the more vigorous facultative bacteria.

It should be appreciated that although prior art systems almost always operate in two-chambered tanks, the present invention can be distinguished by structural and functional difference of the components, as well as the numerous technical advantages that accrue there from. In prior art systems the first chamber is quiescent and acts an anaerobic clarifier that allows the bulk of the particulate organic material to be removed prior to the aerobic digestion stage. This means that such precipitated solids material must be pumped periodically for treatment at a remote location. While the second chamber is the treatment portion for such prior art systems, it is really only treating the soluble part of the waste load, and thus need not to be as effective as the current invention.

In contrast, with the inventive system the first chamber is the active part of the treatment system, in that it digests both the solid organic waste as well as the soluble portion. Accordingly, in contrast to the prior art systems, there is no need for pumping or digestion of any materials outside of the system.

Figures 6A, 6B:
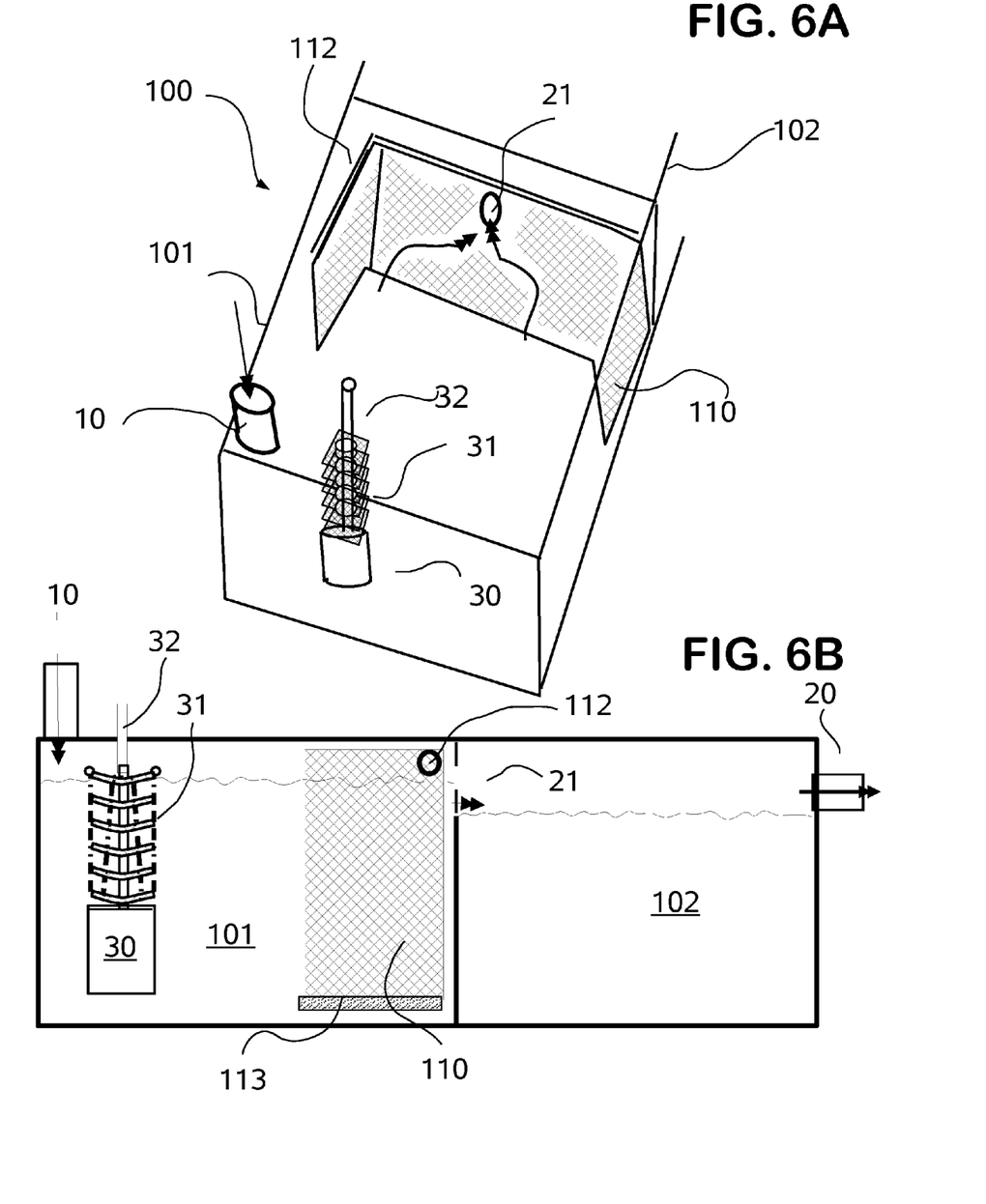

It should be noted that it is problematic trying to do this without the matrix in the first chamber in that that a small amount of residual suspended-solids would remain in the flow leaving the first tank or chamber. These suspended solids would transfer to the second chamber. The second chamber should be able to settle out this extra material, but unfortunately it typically goes anaerobic in which case gases cause the solids to float to the top and become a scum layer. Over time this material will break off segments that go out with the discharge and end up increasing the TSS of the effluent, thus not meeting the secondary treatment levels for solids. These solids also have a biological oxygen demand so the BOD requirements won't be met either. The addition of the matrix in the first aerated chamber allows most of these solids to be captured and digested in the matrix. The second quiescent chamber is still there as insurance and further clarification, but the load is reduced so a scum layer does not build up. Thus, the best results to date have been achieved in the 2 tank configuration of FIG. 6AB, in that it meets the NSF-40 standard. This tank system comprised a first 1,000 gallon (4,000 L) capacity tank and a second 500 gal (2,000 L) capacity tanks, both with a depth of about 52" (about 132 cm) and external dimension of about 5 feet (about 152 cm) by about 9 feet (about 274 cm). The air flow rate into the chamber via the FABG 30 was about 3 cubic ft/min (CFM). However, depending on the effluent loading air flow rates in the first tank 101 may range from about 1.5 to about 5 CFM.

Further, since the improvements in treatment efficiency brought about by the addition of the matrix material will deplete the organic carbon content in the mixed liquor there can be a tendency to promote the colonization by autotrophic ammonia oxidizers in the mixing zone. The device, being placed in the solids chamber where both organic carbon and nitrogen are supplied in raw form, typically allows the oxidation of the ammonia by the autotrophs to occur simultaneously with the denitrification brought about by the facultative bacteria. If, however, the facultative bacteria generated by the FABG 30 become depleted due to the lack of organic carbon the $NO_2$ can be converted to $NO_3$ instead of being denitrified. Use of the wood based Excelsior filter material will provide organic carbon in the form of cellulose to the facultative bacteria thus enhancing their ability to carry out the denitrification reaction, thereby preventing formation of $NO_3$, even when the system does not possess a separate autotrophic growing unit as described in U.S. Pat. Appl. No. 20070227970 A1, supra and U.S. Pat. No. 7,462,285

Figure 5A:
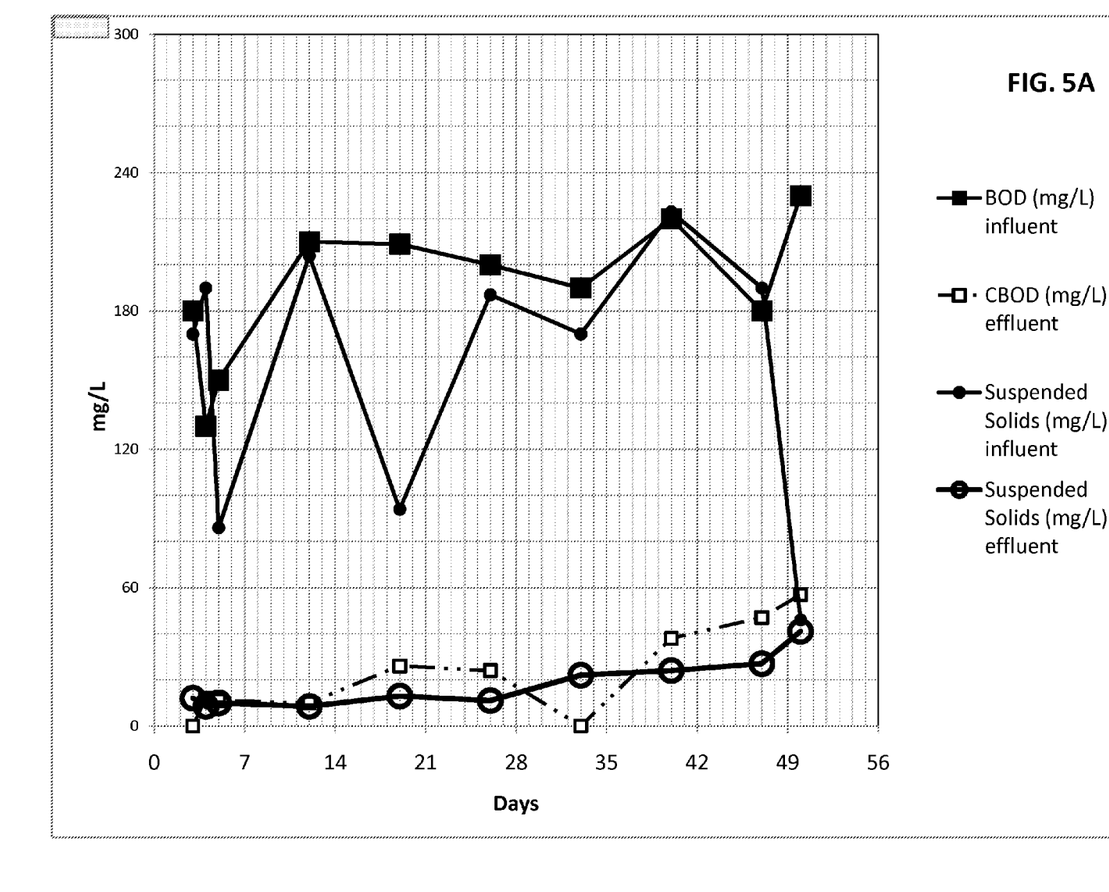
FIGS. 5A and 5B compare the performance of devices without and with a matrix filter respectively.
Figure 5B:
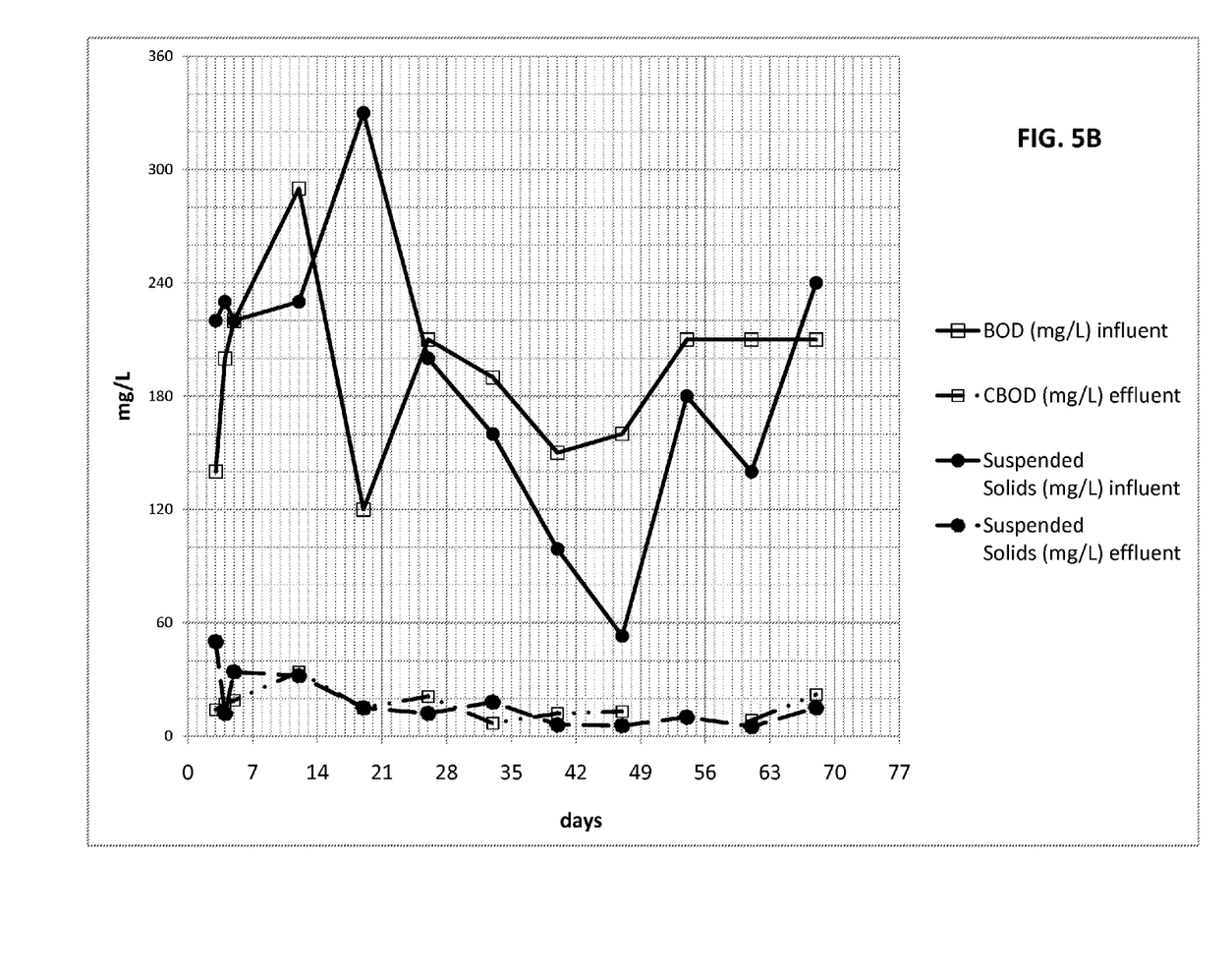

FIGS. 5A and 5B graphically illustrate the performance of the device in FIG. 6 AB without and with the matrix filter during the first 7 weeks of testing with a dosing schedule of 400 kg of waste each Saturday and Sunday, with measurements taken Monday through Friday. The device 100 in FIG. 6AB has the stacked array 31 attached above the FABG unit, consisting of 6 layers, and the U-shaped curtain arrangement of the filter matrix 110 at the outlet end of the first chamber 101. In these tests both the BOD (biological oxygen demand) and CBOD (carbon biological oxygen demand) where measured, CBOD being a more precise measure of carbon only. It should be noted that the CBOD test is more precise because oxygen can be consumed by the process of digestion of organic carbon, but also in the conversion of ammonia to nitrate. Typically it takes 5 days or less to digest the carbon, but greater than 5 days to digest the nitrogen. The conventional BOD5 test process means the test takes 5 days and is assumed to be only carbon. But since some small amount of nitrogen might be included, a CBOD test was developed that uses chemical means to inhibit any digestion of nitrogen. They are effectively the same but the CBOD is a more precise measure of carbon only. The BOD number for the influent is from the treatment plant itself and would be a conventional BOD 5 measure, while the CBOD is taken by the testing facility on the treated liquid and is more precise. It should be noted that the NSF 40 limit of 30 mg/l is based on the CBOD test method.

In addition, the effluent numbers for TSS (total suspended solids) reflect what left the entire system, including the second settling chamber, after any solids passing out of the mixed portion had a chance to settle.

It should be appreciated that in FIG. 5A, being obtained from a septic system having the configuration of FIG. 6AB without the filter matrix 110, though capable of meeting the NSF-40 standard of 30 mg/L initially, starting as low as about 10 mg/L, surpassing the desired limit of 30 mg/L after about 35 and 45 days respectively, there being a generally consistent drift upward of the effluent CBOD and SS. The absence of the filter matrix 110 during these experiments resulted in very high levels of suspended solids due to mixing in the first chamber 101 which passed through into the second chamber 102 and built up a scum layer that continued to send particles out with the discharge, thus failing the solids portion of the treatment.

In contrast, with the inventive system, for which the data is shown in FIG. 5B, though the suspended solids of the effluent start relatively high at about 50 mg/L, there was a general reductions in both biological oxygen demand and suspended solid. Thus, NSF-40, having 30 mg/l or less of Biological Oxygen Demand (BOD) and 30 mg/l or less of Total Suspended Solids (TSS) after about 12 days, with the further trend being a continued reduction in their concentrations, continuing at low levels for the 68 days of testing.

Further, experiments with the configuration in FIG. 6AB showed that not only does the system meet the required BOT/TSS limits, it does so consistently over a much longer time period, even when subject to NSF stress tests between 91-98 days which included the addition of a laundry detergent and a period of power outage for 48 hours.

Tables I and II provide further data of the nitrogen elimination capabilities of device 100 in FIG. 6AB after 48 and 93 days with the above test protocol.

TABLE I (48 days)

| Compound (mg/l) | Influent | Effluent |
|---|---|---|
| TKN | 35.9 | 45.9 |
| NH4 | 27.6 | 21.7 |
| NO2 | 0 | 0.1 |
| NO3 | 0 | 0.5 |
| Total N | 35.9 | 46.6 |

TABLE II (93 days)

| Compound | Influent | Effluent |
|---|---|---|
| TKN | 38.6 | 6.7 |
| $NH_4$ | 24.7 | 2.35 |
| $NO_2$ | 0 | 0.2 |
| $NO_3$ | 0 | 0.7 |
| Total N | 38.6 | 7.6 |

TKN means Total Kjeldahl Nitrogen, measuring reduced forms of nitrogen including proteins in bacterial cells, urea and ammonia. Ammonia ($NH_4$) that was measured separately is also included in the TKN. TN means total nitrogen and it is essentially all the reduced forms measured as TKN plus the oxidized forms, which are typically just $NO_2$ and $NO_3$. Further, the concentration of each form of nitrogen is always expressed "as N" which means that the oxygen or hydrogen or carbon in any particular nitrogen compound is not included. Thus, these Table shows that the system in FIG. 6AB is capable of eventually accomplished at least an 81% reduction in total nitrogen when it reaches a steady state conditions.

However, as shown by a second series of tests, the beneficial reduction of Nitrogen need not require a 48- 93 day incubation period. The test protocol was re-initiated after filter matrix 110 in FIG. 6AB was removed rinsed, and while both the first and second tanks were pumped out. However, advantageously the rinsing still left some of the bacterial colony intact on the filter matrix 110. It was then placed back in the tank and waste loading was recommenced. The nitrogen components of samples taken 12 days later are provided in TABLE II below:

TABLE III (12 days after renewal)

| Compound | Influent | Effluent |
|---|---|---|
| TKN | 42.6 | 20.5 |
| $NH_4$ | 26.8 | 14.0 |
| $NO_2$ | 0 | 0.1 |
| $NO_3$ | 0 | 0.2 |
| Total N | 42.6 | 20.8 |

It should be noted that the 50% reduction in TN in the first two weeks meets the NSF-285 standard, which relates to nitrogen reduction in treatment systems.

Not wishing to be bound by theory, I currently believe that the more important factors that promote the favorable reactions, that is BOD, TSS and total N reductions are (1) time to establish the *Nitrosomonas* culture, which can be accelerated through a sufficient inoculation as evidenced by the results in TABLE III, and (2) and reducing the BOD down to probably less than about 20 mg/l so the dissolved oxygen (DO) is high enough. The DO in the mixing chamber has been above 5 mg/l through most of the portion of the trial in which denitrification reported above in TABLE's I and II has occurred.

Another important feature is that new ammonia or nitrogen coming into the tank (which is food for the autotrophic bacteria, such as *Nitrosomonas*) is accompanied by organic carbon (which is also food for the denitrifying facultative bacteria) so that the reaction is simultaneous and both organisms can be supported.

It should be thus appreciated that the addition of sufficient quantity of facultative bacteria that can denitrify the resulting $NO_2$ is an important part of the system and device disclosed above, as the denitrifying bacteria work best when the facultative bacteria are sufficient in concentration relative to the waste loading that the organic carbon is reduced such that the BOD is less than about 5 mg/l.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

The invention claimed is:

1. A solid digesting treatment tank comprising:
   a) at least a first fluid-containing vessel with at least a first inlet port and a first outlet port,
   b) at least one facultative aerobic bacteria generator (FABG) for providing a source of oxygen to the solid digesting treatment tank,
   c) a plurality of horizontally extending filters disposed in a vertical array for receiving stirred and oxygenated wastewater undergoing digestion from the FABG,
   d) at least one vertical filter media disposed between said FABG and the first outlet port.

2. A solid digesting treatment tank according to claim 1 and further comprising a second fluid-containing vessel having a second inlet port for receiving the soluble portion of the treated waste from the first outlet port and a second outlet port for discharging at least partially treated waste water.

3. A solid digesting treatment tank according to claim 1 further comprising a second vertical filter media disposed between said FABG and the first outlet port that comprises a plurality of vertically disposed filters in an array wherein the filters are parallel to each other and transverse to the vertical filter media disposed between the FABG and the first outlet port.

4. A solid digesting treatment tank according to claim 1 and further comprising at least one autotrophic bacterial generator (ATBG), wherein at least one ATBG supports the growth of autotrophic ammonia oxidizing bacteria and the FABG supports the growth of facultative heterotrophic bacteria that denitrify the oxidized ammonia compounds produced by the autotrophic ammonia oxidizing bacteria.

5. A solid digesting treatment tank according to claim 1 wherein the at least one vertical filter media covers at least the side of the first fluid containing having the first outlet port and a substantially portion of the sides adjacent to the side having the outlet port.

6. A solid digesting treatment tank according to claim 5 and further comprising a plurality of vertically disposed filters in an array wherein the filters are parallel to each other and transverse to the vertical filter media disposed between the FABG and the first outlet port.

7. A solid digesting treatment tank according to claim 4 wherein at least one of the filter media comprises a source of organic carbon to facultative bacteria to enhance their ability to carry out a denitrification reaction, whereby the formation of $NO_3$ is prevented.

8. A solid digesting treatment tank comprising:
a) a first fluid containing vessel with at least a first inlet port and a first outlet port,
b) a second fluid containing vessel having a second inlet port in fluid communication with the first outlet port of the said first fluid containing vessel, and a second outlet port for discharging at least partially treated effluent,
c) at least one FABG disposed in said first fluid containing vessel for providing aeration and mixing of the contents thereof,
d) filter media disposed between the first inlet port and the first outlet port for trapping solid waste and supporting bacterial colonies that digest substantially all of the organic material in the solid waste by converting it to carbon dioxide, with the remaining portion thereof being consumed in enlarging the bacterial colonies,
e) wherein at least a portion of the solid waste trapped by or bacteria colonies supported on the filter media are aerated by the FABG, wherein the soluble portion of the wastewater continues to be treated in said second fluid containing vessel before discharge from the second outlet port.

9. A solid digesting treatment tank according to claim 8 wherein at least a portion of the filter media is disposed in a plurality of parallel arrayed sheets.

10. A solid digesting treatment tank according to claim 9 wherein the filter media disposed in a plurality of parallel arrayed sheet is situated above the FABG.

11. A solid digesting treatment tank according to claim 9 wherein the filter media disposed in a plurality of parallel arrayed sheet is situated between the FABG and the first outlet port.

12. A solid digesting treatment tank according to claim 8 further comprising a vertical filter media disposed between the FABG and the outlet port entry to substantially trap solid waste whereby it is prevented for entering the second fluid containing vessel.

13. A solid digesting treatment tank according to claim 9 further comprising a vertical filter media disposed between the FABG and the outlet port to preclude the entry of solid waste in the second fluid containing vessel.

14. A solid digesting treatment tank according to claim 8 wherein at least one of filter media provides organic carbon in the form of cellulose.

15. A solid digesting treatment tank according to claim 8 and further comprising at least one ATBG, wherein at least one ATBG supports the growth of autotrophic ammonia oxidizing bacteria and the FABG supports the growth of facultative heterotrophic bacteria that denitrify the oxidized ammonia compounds produced by the autotrophic ammonia oxidizing bacteria.

16. A solid digesting treatment tank according to claim 8 and further comprising means for aerating the wastewater in the first fluid containing vessel to encourage the growth of the bacteria colonies on the filter media means that trap the solid waste wherein substantially all of the organic material in the solid waste is converted to carbon dioxide, with the remaining portion thereof being substantially consumed in enlarging the bacterial colonies.

17. A solid digesting treatment tank according to claim 16 wherein the means for aerating the wastewater is an air pump.

18. A solid digesting treatment tank according to claim 1 wherein the FABG comprises a biological host material supported above an air dispensing manifold in a vertical column like sub-chamber that is positioned for partial isolation any surrounding fluid introduced in the first treatment vessel to generate a continuous supply of facultative aerobic bacteria.

19. A solid digesting treatment tank according to claim 4 and further comprising a means to continuously release autotrophic ammonia oxidizing bacteria growing within the ATBG device to the surrounding treatment vessel.

20. A solid digesting treatment tank according to claim 1 and further comprising a filter media means that comprises a source of organic carbon to support the facultative bacteria to enhance their ability to carry out a denitrification reaction, whereby the formation of $NO_3$ is prevented.

* * * * *